INVENTORS
RICHARD SHAW JR.
BRUNO DI TOSTO
BY Herbert L. Harris
ATTORNEY

INVENTORS
RICHARD SHAW JR.
BRUNO DI TOSTO

BY *Herbert L. Davis*
ATTORNEY

INVENTORS
RICHARD SHAW JR.
BRUNO DI TOSTO
BY Herbert L. Davis
ATTORNEY

United States Patent Office 3,282,119
Patented Nov. 1, 1966

3,282,119
MEANS FOR EFFECTING INITIAL ALIGNMENT
OF A STABLE PLATFORM
Richard Shaw, Jr., Mahwah, and Bruno Di Tosto, Clifton,
N.J., assignors to The Bendix Corporation, Teterboro,
N.J., a corporation of Delaware
Filed Sept. 23, 1963, Ser. No. 310,683
10 Claims. (Cl. 74—5.34)

This invention relates to a novel means for effecting initial alignment of a stable platform and more particularly to means for aligning one gimbal mounted platform with another gimbal mounted platform when both are mounted on a maneuvering vehicle.

The specific problem with which the invention is involved is that of aligning a three-gyroscope, three-gimbal platform in an airborne missile with a similar more accurate platform aboard an aircraft carrying the missile and in which the axes of the missile are not in alignment with corresponding axes of the aircraft; although the relationship between the two sets of axes is accurately known.

Heretofore, systems comprising reslovers cascaded in a single chain have been impractical to effect platform orientation because it has been found that such systems define a single axis only. Rotation of the platform about this axis cannot be detected resulting in an ambiguity in indication.

In order to avoid such ambiguity, it is neccesary to employ two reference vectors, but these cannot be transformed simultaneously through a single resolver chain, because it is has been found that in such a single resolver chain, the two reference vectors automatically combine into a single vector. It has been found then that the solution of the problem is to use two parallel resolver chains or to transmit the two reference vector signals through a single resolver chain on a time sharing basis.

An object of the invention is to provide novel means to align a slave platform on a missile with respect to a master platform on an aircraft regardless of the maneuvers of the aircraft or displacement of the missile relative to the aircraft.

Another object of the invention is to provide a single electrical resolver chain for periodically connecting a master platform on an aircraft with a gyroscopic stabilized slaved platform on a missile carried by the aircraft so as to effect alignment of the gyroscopic slave platform with the master platform.

Another object of the invention is to provide such an electrical resolver chain whereby the chain is utilized to periodically effect alignment of the slaved platform about one axis and to effect alignment of the slaved platform about other axes of the platform during other periods of time.

Another object of the invention is to provide an electrical resolver system for operatively connecting a master platform on an aircraft with a gyroscope stabilized slave platform on a missile carried by the aircraft so as to effect alignment of the gyroscope stabilized slave platform with the master platform, together with initially adjusted means to compensate the system for the stowage angle of the missile on the aircraft.

Another object of the invention is to provide means effective upon launching of the missile from an aircraft to operatively connect a telemetering signal to an antenna servo carried by the missile so as to control or sight the antenna in a direction computed on the aircraft.

Another object of the invention is to provide a multi-purpose resolver chain to align a gyroscope stabilized missile platform with respect to a stabilized aircraft platform prior to launching of the missile from the aircraft, and which resolver chain upon the launching of the missile from the aircraft is effective to operate on an antenna control system for the missile in accordance with a telemetering signal received from the aircraft.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

Figure 1:
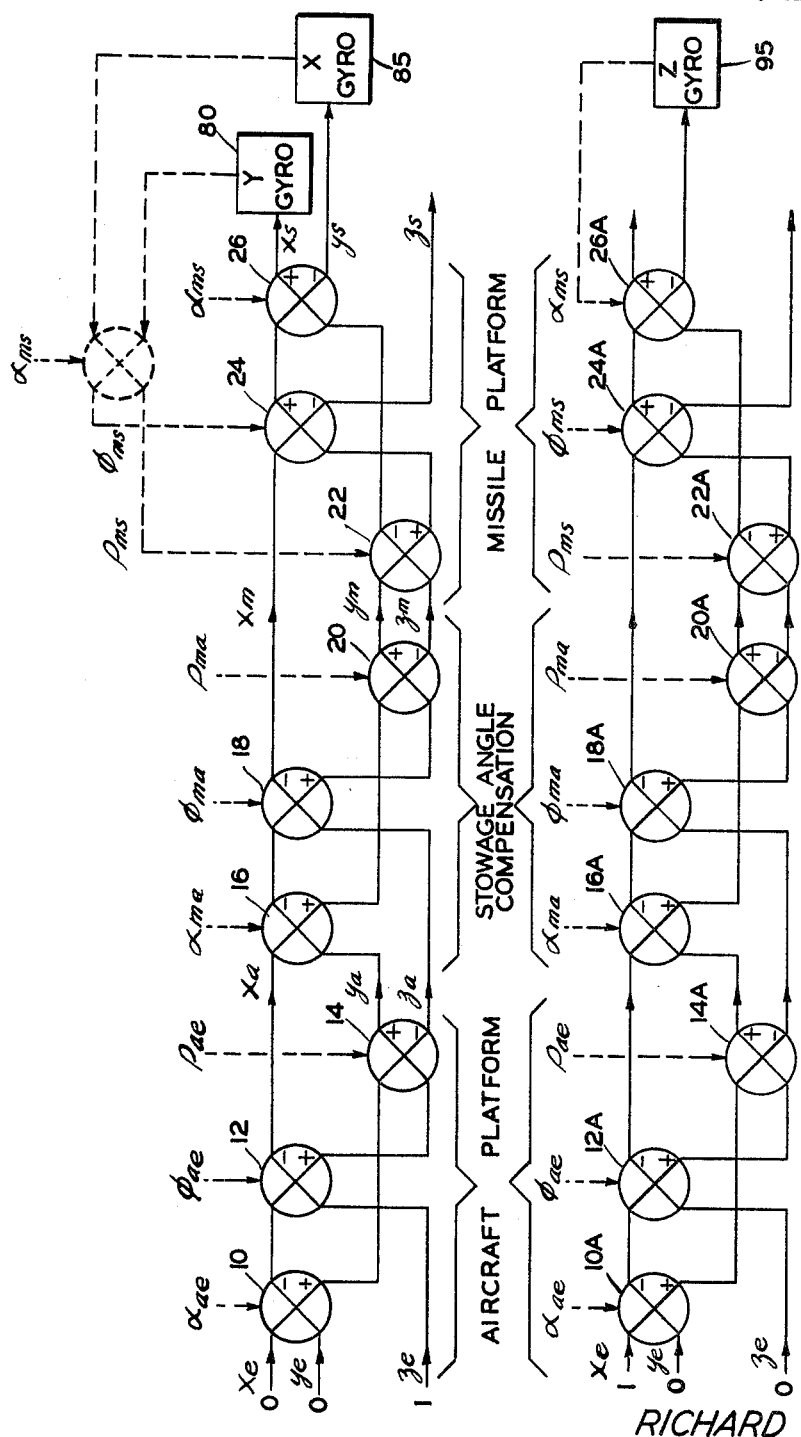
FIGURE 1 is a schematic drawing of a system embodying the invention for effecting initial alignment of a gyroscope stabilized slave platform on a missile with a master platform on an aircraft and including operator-operative means to compensate the system for the stowage angle of the missile on the aircraft.
Figure 2:
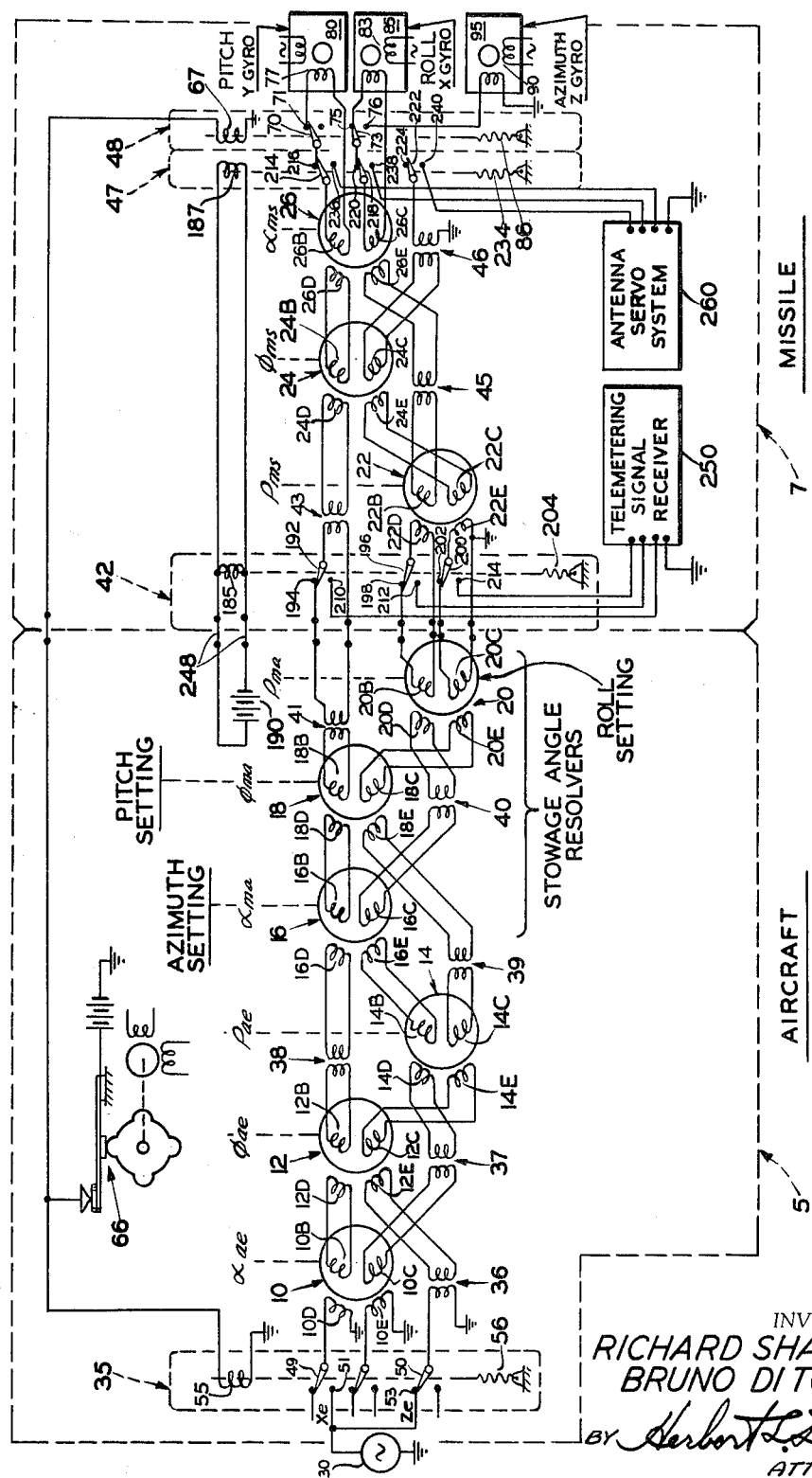
FIGURE 2 is a circuit diagram of a single chain resolver system embodying the invention for effecting the initial alignment scheme of FIGURE 1 on a time sharing basis.
Figure 3:
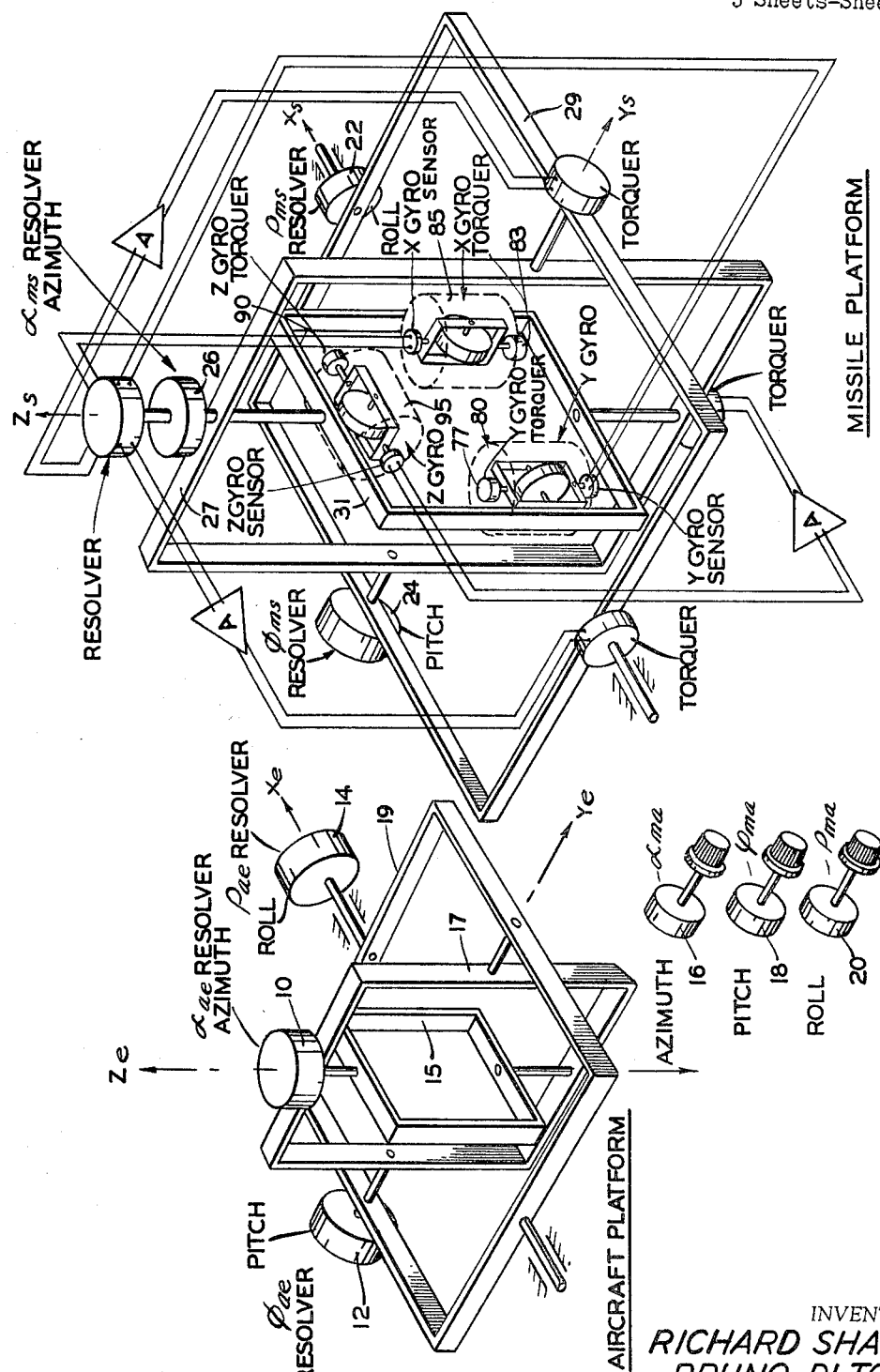
FIGURE 3 is a mechanical diagram illustrating the resolvers of FIGURES 1 and 2 in operative relation to the aircraft and missile platforms and showing the stowage angle resolvers with manual setting knobs to compensate the systems of FIGURES 1 and 2 for the stowage angles of the axes of the missile relative to the corresponding axes of the aircraft.

Referring to the drawings of FIGURES 1, 2 and 3, there is indicated diagrammatically by the numeral 5 an aircraft on which may be stowed a missile 7 preparatory to launching from the aircraft.

Operatively connecting suitable gyroscope controlled platforms on the aircraft and missle is a single chain of resolvers indicated in FIGURE 2 by the numerals 10, 12, 14, 16, 18, 20, 22, 24 and 26 and including switching means so arranged that the single resolver chain may be time shared by two signals developed from a suitable source of alternating current 30, although two separate chains may be utilized, as shown in FIGURE 1, in which corresponding resolvers in the separate chains are indicated by like numerals to which there is applied to the resolvers of the second chain the suffix A.

The new alignment system is shown schematically in FIGURE 1, and it is to be understood that the first three resolvers 10, 12 and 14 of the upper chain and the corresponding resolvers 10A, 12A and 14A of the lower chain are driven by the gimbals of the earth-referenced platform, the second three resolvers 15, 18 and 20 of the upper chain and the corresponding reslovers 16A, 18A and 20A of the lower chain are manually adjustable to represent the misalignment of the axes of the stowed missile 7 relative to those of the aircraft 5. The last three resolvers 22, 24 and 26 of the upper chain and the corresponding resolvers 22A, 24A and 26A of the lower chain are driven by the gimbals of the secondary reference platform in the missile 7. In all cases, the symbols $\alpha$, $\phi$ and $\rho$ indicate azimuth, pitch, and roll angles, respectively. The subscript $e$ refers to the earth-referenced master platform. The subscript $a$ refers to the aircraft. The subscript $m$ refers to the missile and $s$ to the slaved stable element on board the missile. Thus the double subscript $ae$ refers to angles between earth-referenced coordinates and aircraft axes; $ma$ refers to angles between missile axes and aircraft axes; and $ms$ refers to angles between missile axes and slaved-platform axes.

An alternating voltage, representing a unit vector along the $Z_e$ axis is applied to the resolver chain. The first three resolvers actuated by the gimbals of the master platform, resolve this voltage into three voltages, corresponding to the components of the same unit vector along the $X_a$, $Y_a$, and $Z_a$ axes of the aircraft. The next three resolvers having been manually preset to compensate for the missile stowage angles, transform the voltages into three new voltages corresponding to the components of the same unit vector along the $X_m$, $Y_m$, and $Z_m$ axes of the missile. Finally, the last three resolvers, which are driven by the gimbals of the slaved platform, transform the voltages into three more voltages proportional to the components of the unit vector along the $X_s$, $Y_s$, and $Z_s$ axes, shown in FIGURE 3.

If the $Z_s$ axis is parallel to the $Z_e$ axis, the unit vector can have no component along the $X_s$ or $Y_s$ axis. On the other hand, if voltages analogous to $X_s$ and $Y_s$ components exist, they indicate misalignment, and are actually proportional to the sines of the misalignment angles. The voltages analogous to the $X_s$ and $Y_s$ components are, therefore, applied to the torquers of the $Y_s$ and $X_s$ gyros, respectively, in the proper sense to correct the misalignment. Since the sensitive axes of the gyros are not necessarily aligned with the gimbal axes, the angular velocity of gyro precession is resolved by the gimbal mechanism into roll and pitch components as shown by dotted lines in the upper chain of FIGURE 1.

The azimuth axis of the secondary reference is now aligned with that of the earth-reference platform. The secondary X axis must, therefore, be in a horizontal plane, but its direction in that plane is undetermined. Now, if a signal representing a unit vector along the $X_e$ axis is introduced, any misalignment of the $X_e$ and $X_s$ axes will result in a component along the $Y_s$ axis. This component is used to torque the Z gyro until it is zero, indicating that $X_e$ and $X_s$ are parallel. The means to effectuate this is shown schematically in the lower chain of FIGURE 1.

Voltages representing unit vectors along the $Z_e$ and $X_e$ axes are used in order to simplify implementation of the alignment scheme. It is to be noted, however, that any two non-coincident vectors could accomplish the same end. In other words any three voltages might be chosen as inputs to the resolver chain. The condition that the three output voltages are proportional to the corresponding input voltages indicates that three coordinate axes fixed to the slaved platform and three axes fixed to the master platform make identical angles with the reference vector. Misalignment would, in general, affect all three voltages, and further analog computation would be required to determine the correction torques to be applied to the gyros. Rotation of the slave platform about the reference vector would not change the angles between the slaved-platform axes and the reference vector and would, therefore, not change the output voltages. Three other input voltages, not proportional to the first three, could resolve the ambiguity.

In the single resolver chain shown in FIGURE 2, the first three resolvers 10, 12, and 14 have rotor windings 10B and 10C; 12B and 12C; and 14B and 14C, respectively, which are angularly positioned relative to stator winding 10D and 10E; 12D and 12E; and 14D and 14E by the respective gimbals 15, 17, and 19 of the earth-reference platform of the aircraft 5, as shown diagrammatically in FIGURE 3.

The operating mechanism for the aircraft platform, shown in FIGURE 3, may include suitable gyroscopes, accelerometers, and torquers operatively connected in a manner well known in the art and which have not been shown, as not considered necessary for an understanding of the present invention.

The second three resolvers 16, 18, and 20 have rotor windings 16B and 16C; 18B and 18C; and 20B and 20C, respectively, which are initially angularly adjusted relative to stator windings 16D and 16E; 18D and 18E; and 20D and 20E, respectively, so as to compensate for misalignment of the stowage angle of the missile 7 about the azimuth, pitch and roll axes thereof relative to the corresponding axes of the aircraft.

The last three resolvers 22, 24, and 26, shown in FIGURE 2 have rotor windings 22B and 22C; 24B and 24C; and 26B and 26C, respectively, which are angularly positioned relative to stator windings 22D and 22E; 24D and 24E; and 26D and 26E, respectively, by the pitch gimbal 27, azimuth gimbal 31, and roll gimbal 29 of the secondary reference platform of the missile 7, as shown in FIGURE 3.

In the balanced position shown in FIGURE 2, the resolver 10 has a stator winding 10D inductively coupled to the rotor winding 10B while the stator winding 10E is inductively coupled to the rotor winding 10C.

The resolver 12 has a stator winding 12D inductively coupled to the rotor winding 12B while the stator winding 12E is inductively coupled to the rotor winding 12C.

The resolver 14 has a stator winding 14D inductively coupled to the rotor winding 14B while the stator winding 14E is inductively coupled to the rotor winding 14C.

The resolver 16 has a stator winding 16D inductively coupled to the rotor winding 16B while the stator winding 16E is inductively coupled to the rotor winding 16C.

The resolver 18 has a stator winding 18D inductively coupled to the rotor winding 18B while the stator winding 18E is inductively coupled to the rotor winding 18C.

The resolver 20 has a stator winding 20D inductively coupled to the rotor winding 20B while the stator winding 20E is inductively coupled to the rotor winding 20C.

The resolver 22 has a stator winding 22D inductively coupled to the rotor winding 22B while the stator winding 22E is inductively coupled to the rotor winding 22C.

The resolver 24 has a stator winding 24D inductively coupled to the rotor winding 24B while the stator winding 24E is inductively coupled to the rotor winding 24C.

The resolver 26 has a stator winding 26D inductively coupled to the rotor winding 26B while the stator winding 26E is inductively coupled to the rotor winding 26C.

Moreover, it will be seen that, since the rotor windings of the several resolvers having the suffix B are set in the balanced position at right angles to the stator windings having the suffix E and the rotor windings having the suffix C are set at right angles to the stator windings having the suffix D, there will be no inductive coupling between these respective stator and rotor windings.

However, upon angular adjustment of the rotor of such resolvers to one side or other of the balanced position, there will develop between windings C and D and between windings B and E inductive coupling proportional to the sine of the angular displacement from the balanced position. At the same time, coupling between windings D and B and between windings E and C is reduced proportionally to the cosine of the angular displacement. This property of resolvers is responsible for their widespread use in the analog computation of coordinate transformations of vectors.

Further, it will be seen from the circuit diagram of FIGURE 2 that the stator windings 10D of the resolver 10 may be selectively connected to the source of alternating current 30 upon operation of the switch mechanism 35 in one sense while the stator winding 12E of the resolver 12 may be selectively connected to the source of alternating current 30 upon operation of the switch mechanism 35 in an opposite sense. The stator winding 12E is inductively coupled to the switch mechanism 35 by a dummy resolver, or transformer 36.

It will be further seen that the rotor winding 10B of the resolver 10 is electrically connected to the stator winding 12D of the resolver 12 while the rotor winding 10C of the resolver 10 is inductively coupled through a transformer 37 to the stator winding 14D of the resolver 14. Further, the rotor winding 12B of the resolver 12 is inductively coupled through a transformer 38 to the stator winding 16D of the resolver 16. The rotor winding 14B of the resolver 14 is electrically connected to the stator winding 16E of the resolver 16 while the rotor winding 14C of the resolver 14 is inductively coupled through a transformer 39 to the stator winding 18E of the resolver 18.

The rotor winding 16B of the resolver 16 is electrically connected to the stator winding 18D of the resolver 18 while the rotor winding 16C is inductively coupled through a transformer 40 to a stator winding 20D of the resolver 20.

The rotor winding 18C of the resolver 18 is electrically connected to the stator winding 20E of the resolver 20 while the rotor winding 18B of the resolver 18 is inductively coupled through a transformer 41, switch mechanism 42, and transformer 43 to the stator winding 24D of the resolver 24.

Further, the rotor winding 20B of the resolver 20 is electrically connected through the switch mechanism 42 to the stator winding 22D of the resolver 22 while the rotor winding 20C of the resolver 20 is electrically connected through the switch mechanism 42 to the stator winding 22E of the resolver 22.

The rotor winding 22C of the resolver 22 is electrically connected to the stator winding 24E of the resolver 24 while the stator winding 22B of the resolver 22 is inductively coupled through a transformer 45 to the stator winding 26E of the resolver 26.

The rotor winding 24B of the resolver 24 is electrically connected to the stator winding 26D of the resolver 26 while the stator winding 24C of the resolver 24 is inductively coupled through a transformer 46 and a switch mechanism 47 to output connections as hereinafter described.

The rotary winding 26B of the resolver 26 is also electrically connected through the switch mechanism 47 and a switch mechanism 48 to other output connections and similarly the rotor winding 26C of the resolver 26 is electrically connected through the switch mechanisms 47 and 48 to still other output connections, as will be described hereinafter.

As shown in FIGURE 2, the switch mechanism, indicated generally by the numeral 35 includes switching devices 49 and 50 for selectively closing switch contacts 51 and 53, respectively, connected to the source of alternating current 30. An electromagnetic winding 55 controls the switch devices 49 and 50 and is effective upon energization to cause switch device 50 to close contact 53 and switch device 49 to open contact 51 and upon de-energization to permit a spring 56 to bias switch device 49 so as to close contact 51 and switch device 50 to open contact 53.

Energization of the electromagnetic winding 55 may be controlled by a suitable motor driven cam operated control switch 66 in timed relation with energization of an electromagnetic winding 67 controlling the switching mechanism 48 carried on the missile 7.

The switch mechanism 48 may include a switch device 70 for selectively closing a contact 71 and a switch device 73 for selectively closing switch contacts 75 and 76. The electromagnetic winding 67 is effective upon energization to cause switch device 70 to close the contact 71 so as to connect, as shown in FIGURE 2, an output across rotor winding 26B of the resolver 26 to the control winding of a torquer motor 77 which may be of a conventional two-phase type and controlling the torque applied to the Y gyroscope 80 mounted on the gimbal 31 as shown in FIGURE 3. The resulting precession of the Y gyroscope is accommodated by rotation of gimbal 27 or gimbal 29 or both, depending on the azimuth orientation of gimbal 31. Relative rotation of the gimbals results in corresponding rotation of the rotors of resolvers 24 and 22.

Further, energization of the electromagnetic winding 67 is effective to cause the switch device 73 to close the contact 75 so as to connect an output across winding 26C of the resolver 26 to the control winding of the torquer motor 83 which may be of a conventional two-phase type and controlling the torque applied to the X gyroscope 85 also mounted on the gimbal 31, as shown in FIGURE 3. The resulting precession of the X gyroscope is accommodated by rotation of gimbal 27 or gimbal 29 or both, depending on the azimuth orientation of gimbal 31. Relative rotation of the gimbals results in corresponding rotation of the rotors of resolvers 24 and 22.

The face that the X and Y gyros each effect a rotation about both the roll and pitch axes (except when the $X_s$ and $Y_s$ axes happen to coincide with the roll and pitch axes) is a manifestation of the mechanical resolution mentioned.

However, upon de-energization of the electromagnetic winding 67, the switch devices 70 and 73 are biased under force of a spring 86 so that the switch device 70 opens the contact 71 while the switch device 73 opens the contact 75 and closes the second contact 76 so as to connect the output from winding 26C of the resolver 26 to a torquer motor 90 which also may be of a conventional two-phase type controlling the torque applied to the azimuth Z gyroscope 95 also mounted on the gimbal 31 and arranged to control the position of the gimbal 31 about the azimuth axis and the rotor of resolver 26 in accordance therewith, as shown in FIGURE 3.

As has been heretofore explained, the energization of both the electromagnetic winding 55 and the electromagnetic winding 67 are controlled in synchronism by the opening and closing of the timing switch 66. It will be seen then that upon the switch 50 being biased by the electromagnetic winding 55 so as to close the switch contact 53 and the switch devices 70 and 73 being simultaneously actuated by the electromagnetic winding 67 so as to close the contacts 71 and 75, respectively, there will be applied by the source of alternating current 30 through the chain of resolvers a signal voltage representing a unit vector along the $Z_e$ axis of the aircraft azimuth platform of FIGURE 3, and which signal voltage will be applied through the chain of resolvers, as shown in FIGURE 2.

If the azimuth axis, $Z_s$, of the slave platform is in alignment with the azimuth axis $Z_e$, of the master platform in the aircraft, no signal will be applied to the pitch and roll gyroscopes.

However, if the slave azimuth axis is out of alignment with the master azimuth axis, there will be resultant signals applied across the control windings of the torquer motors of one, or the other or both of the torquer motors, 77 and 83, of the Y and X gyroscopes, 80 and 85, to effect a controlling action bringing axes $Z_s$ and $Z_e$ into such aligned condition, owing to the energization of the control winding 67 causing the switching device 73 to close the contact 75 connecting the control windings of the torquer motors 80 and 85 across the outputs of the windings 26B and 26C of the resolver 26.

Thus, through the foregoing operation, there is applied through the chain of resolvers a voltage representing a unit vector along the $Z_e$ axis, components of which are applied to the X and Y gyroscopes, 85 and 80, to bring one axis of the slave platform, $Z_s$, into proper alignment with the corresponding axis, $Z_e$, of the master platform, regardless of the attitudes of the roll and pitch axes of both platforms.

If the secondary reference is properly aligned, the vector will also lie along the $Z_s$ axis and the $X_s$ and $Z_s$ components will be zero. However, if the X and Y gyroscopes are not aligned with the roll and pitch axes, the gimbal mechanism will mechanically resolve the rates about the X and Y axes into roll and pitch rates. This operation is indicated schematically in the upper chain of FIGURE 1.

Now, upon the timer mechanism 66 causing the electromagnetic windings 55 and 67 to be de-energized, the spring device 56 will actuate the switch 50 so as to open the switch contact 53 and the switch 49 so as to close the contact 51 while at the same time the spring 86 causes the switch device 70 to open the contact 71 and the switch device 73 to open the contact 75 and close the contact 76 whereupon an output across winding 26C of the resolver 26, as shown in FIGURE 2, will be connected across the control winding of the Z gyro torquer motor 90.

Actuation of switching device 49 to close contact 51 will apply a voltage from the source of alternating current 30 through the chain of resolvers 12, 14, 16, 18, 20, 22, 24 and 26. No signal voltage is applied to the control windings of the torquer motors 77 and 83 since the switching devices 70 and 73, by the de-energization of the control electromagnetic winding 67, are actuated to disconnect the control windings of the torquer motors 77 and 83. However, control winding 90 of the Z gyroscope 95 is connected to the output of coil 26C through switching device 73 and contact 76.

If axis $X_s$ of the slaved platform is aligned with the corresponding axis, $X_e$, of the master platform, no signal reaches the torquer, 90, of the Z gyro, 95. However, upon the $X_s$ axis of the slaved platform being out of such alignment, a signal will be applied through the resolver chain, through the switching device 73 and contact 76, to the control winding of the azimuth gyro torquer 90. The resulting torque will precess the Z gyro, and thus the slaved platform to which it is rigidly connected, about the $Z_s$ axis in the proper sense to bring the $X_s$ axis into alignment with the $X_e$ axis.

Thus, if a signal representing a unit vector along the $X_e$ axis of the aircraft platform is introduced by the switch 49 closing the contact 51, any misalignment of the $X_e$ axis of the aircraft platform with relation to the $X_s$ axis of the missile platform, will result in the component along the $Y_s$ axis. This component is used to torque the Z gyro 95 until it is zero, indicating that the $X_e$ and $X_s$ axes are parallel.

This action is shown diagrammatically in the lower chain of FIGURE 1 and is effected in the single chain of resolvers of FIGURE 2 by the switch 49 closing the contact 51 and the switch 75 closing the contact 76.

In practice, the switching from one of these modes of operation to the other by the energization and de-energization of the switch control electromagnetic windings 55 and 67 under control of the timing device 66 may occur several times a second so that alignment will proceed simultaneously about all three axes.

It is interesting to note that the alignment process decribed is, in effect, the mechanization of two basic theorems of vector algebra.

Referring again to the upper chain of FIGURE 1, we have provided an earth-referenced vector, $i_e 0 + j_e 0 + k_e 1$, in which $i_e$, $j_e$, and $k_e$ are unit vectors along the $X_e$, $Y_e$, $Z_e$ axes, respectively, as shown in FIGURE 3. The components of this vector along the axes of the secondary reference platform are $i_s x_s + j_s y_s + k_s z_s$ in which $i_s$, $j_s$ and $k_s$ are unit vectors along the $X_s$, $Y_s$, and $Z_s$ axes, respectively, as shown in FIGURE 3. We now assume another vector, $i_s 0 + j_s 0 + k_s 1$ along the azimuth axis of the secondary platform. The two vectors (and therefore, the two azimuth axes) will be parallel if their vector product vanishes. That is:

$$(i_s x_s + j_s y_s + k_s z_s) \times (i_s 0 + j_s 0 + k_s 1) = i_s y_s - j_s x_s = 0$$

which is the condition realized by torquing the X and Y gyros.

Referring now to the lower chain in FIGURE 1, an earth-referenced vector $i_e 1 + j_e 0 + k_e 0$, has been provided. In the coordinate frame of the secondary reference platform, it is $i_s x' + j_s y' + k_s z'$. If we assume a vector, $$i_s 0 + j_s 1 + k_s 0$$

along the Y axis of the secondary platform, the two platforms will be completely aligned when the scalar product of these two vectors vanishes, because the earth-reference X axis is then perpendicular to the secondary Y axis.

$$(i_s x' + j_s y' + k_s z') \quad (i_s 0 + j_s 1 + k_s 0) = y' = 0$$

This condition is realized by torquing the Z gyro.

In the single chain of resolvers, shown in FIGURE 2, the alignment scheme of FIGURE 1 may be effected by the use of fewer components through the time sharing action of the timing mechanism 66 in controlling the switching mechanism 35 and 48, as heretofore explained.

Moreover, the application of a single chain of resolvers herein provided has an additional advantage of using the gimbal angle resolvers 22, 24 and 26 for later phases of operation after the launching of the missile 7 from the aircraft 5 while such resolvers are also available to effect the initial alignment of the missile platform with the aircraft platform, as modified by the stowage angle resolvers 14, 16 and 18.

In the latter phase of operation, there are provided switch mechanisms 42 and 47 including electromagnetic windings 185 and 187, and which are parallel connected and energized from a common source of electrical energy 190 such as a battery. The electromagnetic control winding 185 is arranged so that upon energization a switch device 192 is biased so as to close a switch contact 194, and a switch device 196 so as to close a switch contact 198 and a switch device 200 so as to close a contact 202. However, upon de-energization of the electromagnetic winding 185, the switch devices 192, 196 and 200 are biased by a spring 204 so as to open the respective contacts 194, 198, and 202 and close contacts 210, 212 and 214, respectively.

The electromagnetic control winding 187 is in turn arranged to bias a switch device 214 so as to close a contact 216, a switch device 218 so as to close a contact 220, and a switch device 222 so as to close a contact 224. However, upon de-energization of the electromagnetic winding 187, the switch devices 214, 218 and 222 are biased by a spring 234 so that the switch device 214 opens the switch contact 216 and closes a switch contact 236. The switch device 218 opens the switch contact 220 and closes a switch contact 238 and switch device 222 opens a contact 224 and closes a switch contact 240.

Thus, de-energization of the electromagnetic windings 185 and 187 is effected upon the launching of the missile 7 from the aircraft 5 by the breaking of electrical connections 248 leading from the battery 190 to the electromagnetic windings 185 and 187. Thereupon the initial operation of the resolvers 22, 24 and 26 in effecting alignment of the platforms of the missile 7 and the platforms in the aircraft 5 is discontinued and the switches 192, 196 and 200 under the biasing force of the spring 204 are actuated so as to close the switch contacts 210, 212 and 214 for operatively connecting through the resolvers 22, 24 and 26 telemetering signals applied through a receiver 250 of conventional type, and which signals may be transmitted by conventional means from the mother aircraft 5 upon the launching of the missile 7 to the signal receiver 250.

The switch devices 214, 218 and 222 upon de-energization of the electromagnetic winding 187 are biased by the spring 234 so as to close the contacts 236 238 and 240 to connect outputs from the winding 24C of the resolver 24 and windings 26B and 26C of the resolver 26 to an antenna servo system 260 of conventional type.

The telemetering signals applied through the resolvers 22, 24 and 26 will be modified by the adjustment of such resolvers by the positioning of the gimbals 27, 29 and 31 so as to torque the respective antenna servos in accordance with the telemetering signals as applied by the mother aircraft to the receiver 250 and dependent upon the resulting positioning of the missile gimbals 27, 29 and 31.

The antenna servo system 260 may be of a suitable conventional type and has been shown herein merely by block diagram as has also the telemetering system 250 which may likewise be of a suitable conventional type. The signals applied to the antenna servo system 260 may effect the same so as to sight or adjust the antenna in a sense and direction as computed by suitable mechanism in the mother aircraft 5 for phases of operation following the launching of the missile 7 from the mother aircraft 5.

Although only two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an apparatus of a type including a first stabilized three-gimbal master platform, a second three-gimbal slave platform, three gyroscopes, said gyroscopes for stabilizing said slave platform, each of said gyroscopes including a torquer motor, both of said platforms including resolvers controlled by the angular positions of the gimbals of said platforms relative to supporting means for said gimbals; the improvement comprising additional resolvers for adjustment to compensate for misalignment of the supporting means for the slave platform relative to the supporting means for the master platform, a resolver chain means having a pair of electrical inputs and three electrical signal outputs, all of said resolvers being electrically connected in cascade in said resolver chain means so as to effect a transformation of components of a vector from coordinates fixed in the master platform to coordinates fixed in the slave platform, first means for connecting electrical pulses into said resolver chain means through said pair of eletcrical inputs, and second means for electrically connecting each of said electrical signal outputs so as to control the torquer motor of one of each of said gyroscopes in such a manner as to align the slave platform with the master platform.

2. The combination defined by claim 1 in which the first connecting means includes first switch means alternately operable for connecting said electrical pulses through one and the other of said pair of electrical inputs, and said second connecting means includes second switch means alternately operable for connecting the electrical signals from said outputs so as to control the torquer motor of each of said gyroscopes, and means for operating said first and second switch means in synchronism.

3. In an apparatus of a type including a first stabilized three-gimbal master platform, a second three-gimbal slave platform, three gyroscopes, said gyroscopes for stabilizing said slave platform, each of said gyroscopes including a torquer motor, both of said platform including resolvers controlled by the angular positions of the gimbals of said platforms relative to supporting means for said gimbals; the improvement comprising additional resolvers for adjustment to compensate for misalignment of the supporting means for the slave platform relative to the supporting means for the master platform, a resolver chain means having a pair of electrical inputs and three electrical signal outputs, all of said resolvers being electrically connected in cascade in said resolver chain means, said resolver chain means including first switching means rendering said resolver alternately effective for applying in said chain means different controlling signals indicative of noncoincident vectors, said switching means at said electrical signal outputs for electrically connecting each of said electrical signal outputs so as to control the torquer motor of one of each of said gyroscopes in such a manner as to align the slave platform with the master platform so as to reduce said controlling signals to null, and means for operating said first and second switching means in synchronism.

4. Means for effecting alignment of a first three-gimbal platform in relation to a second stabilized three-gimbal platform, the first platform being supported by a missile carried by an aircraft, and the second platform being supported by the aircraft; said alignment means comprising three gyroscopes, said gyroscopes for stabilizing the first platform, each of said gyroscopes having a torquer motor, said first platform including resolvers controlled by the angular positions of the gimbals of said first platform relative to the supporting missile, said second platform including resolvers controlled by the angular positions of the gimbals of said second platform relative to the supporting aircraft, additional resolvers for adjustment to compensate for misalignment of the missile relative to the aircraft, a resolver chain having a pair of electrical inputs and three electrical signal outputs, all of said resolvers being electrically connected in cascade in said resolver chain so as to effect a transformation of a vector from coordinates fixed in the second platform to coordinates fixed in the first platform, first means for connecting a source of alternating current into said resolver chain through said pair of electrical inputs, and second means for electrically connecting each of said electrical signal outputs so as to control the torquer motor of one of each of said gyroscopes in such a manner as to align the second platform with the first platform.

5. The combination defined by claim 4 including first switching means for selectively connecting said source of alternating current to said pair of electrical inputs, second switching means for selectively connecting said electrical signal outputs so as to control said torquer motors, and timing means for operating said first and second switching means in synchronism.

6. Means for effecting alignment of a first three-gimbal platform in relation to a second stabilized three-gimbal platform, the first platform being supported by a missile carried by an aircraft, and the second platform being supported by the aircraft; said alignment means comprising three gyroscopes, said gyroscopes for stabilizing the first platform, each of said gyroscopes having a torquer motor, said first platform including resolvers controlled by the angular positions of the gimbals of said first platform relative to the supporting missile, said second platform including resolvers controlled by the angular positions of the gimbals of said second platform relative to the supporting aircraft, a resolver chain, all of said resolvers being electrically connected in cascade in said resolver chain so as to effect a transformation of a vector from coordinates fixed in the second platform to coordinates fixed in the first platform, and means rendered effective upon the missile leaving the aircraft for operatively connecting output signals from a telemetering signal receiver through the resolvers of said first platform to inputs of a servo system on said missile to be controlled thereby.

7. The combination defined by claim 6 in which said connecting means includes a first relay means rendered effective upon the missile leaving the aircraft for operatively connecting output signals from a telemetering signal receiver to inputs of the resolvers of said first platform, and second relay means simultaneously rendered effective upon the missile leaving the aircraft for operatively connecting output signals from the resolvers of said first platform to inputs of a servo system on said missile to be controlled thereby.

8. In an apparatus of a type including a first stabilized multiple gimbal master platform, a second multiple gimbal slave platform, gyroscopic means for stabilizing said slave platform, said gyroscopic means including torquer motor means, both of said platforms including resolvers controlled by the angular positions of the gimbals of said platforms relative to supporting means for said gimbals; the improvement comprising additional resolvers for adjustment to compensate for misalignment of the supporting means for the slave platform relative to the supporting means for the master platform, an electrical network having multiple electrical inputs and multiple electrical signal outputs, all of said resolvers being electrically connected in said electrical network so as to effect a transformation of components of a vector from coordinates fixed in the master platform to coordinates fixed in the slave platform, first means for connecting electrical pulses into said electrical network through said multiple electrical inputs, and second means for electrically connecting said multiple electrical signal outputs so as to control the torquer motor means of said gyroscopic means in such a manner as to align the slave platform with the master platform.

9. In an apparatus of a type including a first stabilized multiple gimbal master platform, a second multiple gimbal slave platform, gyroscopic means for stabilizing said slave platform, said gyroscopic means including torquer motor means, both of said platforms including resolvers controlled by the angular positions of the gimbals of said platforms relative to supporting means for said gimbals; the improvement comprising an electrical network having multiple electrical inputs and multiple electrical signal outputs, all of said resolvers being electrically connected in said electrical network so as to effect a transformation of components of a vector from coordinates fixed in the master platform to coordinates fixed in the slave platform, first means for connecting electrical pulses into said electrical network through said multiple electrical inputs, and second means for electrically connecting said multiple electrical signal outputs so as to control the torquer motor means of said gyroscopic means in such a manner as to align the slave platform with the master platform.

10. In an apparatus of a type including a first stabilized multiple gimbal master platform, a second multiple gimbal slave platform, gyroscopic means for stabilizing said slave platform, said gyroscopic means including torquer motor means, both of said platforms including resolvers controlled by angular positions of the gimbals of said platforms in relation to supporting means for said gimbals; the improvement comprising an electrical network having multiple electrical signal inputs and multiple electrical signal outputs, means for connecting electrical input signals into said electrical network through said multiple electrical inputs, all of said resolvers being electrically connected in said electrical network so as to modify said input signals in accordance with functions of the angular positions of the gimbals, and means for electrically connecting said multiple electrical signal outputs so as to control the torquer motor means of the gyroscopic means in such a manner as to align said slave platform with said master platform.

No references cited.

FRED C. MATTERN, JR., *Primary Examiner.*

P. W. SULLIVAN, *Assistant Examiner.*